US009183005B2

(12) United States Patent
Brunner et al.

(10) Patent No.: US 9,183,005 B2
(45) Date of Patent: *Nov. 10, 2015

(54) METHOD AND APPARATUS FOR RESIZING BUFFERED WINDOWS

(75) Inventors: Ralph Brunner, Santa Clara, CA (US); Peter Graffagnino, San Francisco, CA (US); Andrew Barnes, Foster City, CA (US)

(73) Assignee: Apple Inc., Cupertino, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 13/595,695

(22) Filed: Aug. 27, 2012

(65) Prior Publication Data

US 2013/0167076 A1    Jun. 27, 2013

Related U.S. Application Data

(63) Continuation of application No. 11/985,380, filed on Nov. 14, 2007, now Pat. No. 8,255,826, which is a continuation of application No. 10/193,404, filed on Jul. 10, 2002, now Pat. No. 7,302,648.

(51) Int. Cl.
  *G06F 17/00* (2006.01)
  *G06F 3/048* (2013.01)
  *G06F 9/44* (2006.01)
  *G06F 3/0481* (2013.01)

(52) U.S. Cl.
  CPC ............ *G06F 9/4443* (2013.01); *G06F 3/0481* (2013.01)

(58) Field of Classification Search
  CPC ....... G06F 21/629; G06F 9/543; G06F 9/544; G06F 3/0481; G06F 9/443; G09G 9/443
  See application file for complete search history.

(56) References Cited

U.S. PATENT DOCUMENTS

| 4,823,108 A * | 4/1989 | Pope ............................ 715/806 |
| 4,890,257 A | 12/1989 | Anthias et al. |
| 5,163,046 A | 11/1992 | Hahne et al. |
| 5,297,251 A | 3/1994 | Alcorn et al. |
| 5,434,964 A | 7/1995 | Moss et al. |
| 5,463,422 A | 10/1995 | Simpson et al. |
| 5,522,025 A | 5/1996 | Rosenstein |
| 5,721,849 A | 2/1998 | Amro |
| 5,742,788 A | 4/1998 | Priem et al. |
| 5,751,283 A | 5/1998 | Smith |

(Continued)

OTHER PUBLICATIONS

Bricknell, K J, "Macintosh C Carbon", A Hobbyist's Guide to Programming the Macintosh in C version 1.0, (2001).

(Continued)

*Primary Examiner* — Tadeese Hailu
(74) *Attorney, Agent, or Firm* — Blank Rome LLP

(57) ABSTRACT

Methods and apparatuses for resizing buffered windows. In one aspect of the invention, a method to resize a buffered window on a data processing system includes: determining an estimated size for a window which has a first pixel image of a first size buffered in a first window buffer; allocating a second window buffer which is large enough to buffer the window in the estimated size; and buffering a second pixel image of the window in a second size in the second window buffer. In one example according to this aspect, a portion of a frame buffer is updated to the second pixel image to display the window in the second size. A portion of the second window buffer, storing the data that represents the second pixel image, is clipped to update the corresponding portion of the frame buffer.

21 Claims, 10 Drawing Sheets

(56) References Cited

U.S. PATENT DOCUMENTS

| | | | |
|---|---|---|---|
| 5,883,634 | A | 3/1999 | Narayanaswami |
| 5,936,672 | A | 8/1999 | Ahnn |
| 5,956,032 | A | 9/1999 | Argiolas |
| 6,005,572 | A | 12/1999 | Kurihara |
| 6,023,275 | A | 2/2000 | Horvitz et al. |
| 6,081,818 | A | 6/2000 | Shieh |
| 6,373,526 | B1 | 4/2002 | Kessler et al. |
| 6,573,904 | B1 * | 6/2003 | Chun et al. ............... 345/629 |
| 6,587,112 | B1 | 7/2003 | Goeltzenleuchter et al. |
| 6,628,291 | B1 | 9/2003 | Edrington et al. |
| 6,892,359 | B1 | 5/2005 | Nason et al. |
| 6,999,087 | B2 | 2/2006 | Lavelle et al. |
| 7,302,648 | B1 | 11/2007 | Brunner et al. |
| 8,255,826 | B2 | 8/2012 | Brunner et al. |
| 2002/0186253 | A1 | 12/2002 | Rodden et al. |
| 2002/0191027 | A1 | 12/2002 | Morrow et al. |
| 2003/0107604 | A1 | 6/2003 | Ording |
| 2004/0025112 | A1 | 2/2004 | Chasen et al. |
| 2008/0072173 | A1 | 3/2008 | Brunner et al. |

OTHER PUBLICATIONS

Towell, Dwayne, "Display Maintenance, A Pattern Language", (Aug. 2, 1998).

"U.S. Appl. No. 10/193,404, Final Office Action mailed Aug. 18, 2006", 12 pgs.

"U.S. Appl. No. 10/193,404, Non Final Office Action mailed Jan. 31, 2007", 12 pgs.

"U.S. Appl. No. 10/193,404, Non Final Office Action mailed Mar. 1, 2006", 11 pgs.

"U.S. Appl. No. 10/193,404, Non Final Office Action mailed Sep. 8, 2005", 11 pgs.

"U.S. Appl. No. 10/193,404, Notice of Allowance mailed Jul. 26, 2007", 6 pgs.

"U.S. Appl. No. 10/193,404, Response filed Jun. 5, 2006 to Non Final Office Action mailed Mar. 1, 2006", 26 pgs.

"U.S. Appl. No. 10/193,404, Response filed Jun. 5, 2007 to Non Final Office Action mailed Jan. 31, 2007", 23 pgs.

"U.S. Appl. No. 10/193,404, Response filed Nov. 22, 2006 to Final Office Action mailed Aug. 18, 2006", 20 pgs.

"U.S. Appl. No. 10/193,404, Response filed Dec. 12, 2005 to Non Final Office Action mailed Sep. 8, 2005", 20 pgs.

"U.S. Appl. No. 11/985,380, Applicant's Summary of Examiner Interview filed Feb. 6, 2012", 1 pg.

"U.S. Appl. No. 11/985,380, Examiner Interview Summary mailed Jan. 4, 2012", 3 pgs.

"U.S. Appl. No. 11/985,380, Final Office Action mailed Jun. 3, 2011", 9 pgs.

"U.S. Appl. No. 11/985,380, Non Final Office Action mailed Jan. 19, 2011", 8 pgs.

"U.S. Appl. No. 11/985,380, Notice of Allowance mailed May 3, 2012", 7 pgs.

"U.S. Appl. No. 11/985,380, Preliminary Amendment filed Nov. 14, 2007", 3 pgs.

"U.S. Appl. No. 11/985,380, Response filed Apr. 19, 2011 to Non Final Office Action mailed Jan. 19, 2011", 9 pgs.

"U.S. Appl. No. 11/985,380, Response filed Oct. 3, 2011 to Final Office Action mailed Jun. 3, 2011", 11 pgs.

* cited by examiner

METHOD AND APPARATUS FOR RESIZING BUFFERED WINDOWS

This application is a continuation of and claims the benefit of priority to U.S. patent application Ser. No. 11/985,380, filed Nov. 14, 2007, which is a continuation of and claims the benefit of priority to co-pending U.S. patent application Ser. No. 10/193,404, filed Jul. 10, 2002, entitled "METHOD AND APPARATUS FOR RESIZING BUFFERED WINDOWS". The respective disclosures of each application are incorporated herein by reference in its entirety.

FIELD OF THE INVENTION

The invention relates to graphical user interfaces, and more particularly to resizing buffered windows.

BACKGROUND OF THE INVENTION

In a graphical user interface on a computer system, a user can continuously resize a window until the window has a desirable size. For example, the user may drag a portion of the border of a window to change the size of the window continuously (e.g., press down and hold a button of a mouse when the cursor is on the portion of the border, and move the mouse while holding down the button). The change is finalized when the user releases the dragged portion of the border (e.g., release the button which was held down during dragging the border).

On some systems, when the size of the window is continuously changed, only a rectangle is displayed to indicate the current position of the border of the window. After the change is finalized, the window is redrawn to show the contents in the window of the new size.

On other systems, live resizing is performed. When the size of the window is continuously changed, the window is redrawn a number of times to show the contents in the window changing size as the window is continuously resized. Since live resizing shows the changing contents in the window as the window is continuously resized, live resizing provides better feedback to the user than merely redrawing the border of the window to show the changing size of the window.

In a buffered windows system, resizing a window is expensive because a new buffer is allocated and the new content for the window is filled into the allocated buffer. The problem is particularly problematic for live resizing, as any delay is directly experienced by the user.

FIG. 2 illustrates a buffered window system. In a buffered window system, applications draw contents in the window buffers; and the window system combines the images buffered in window buffers in a frame buffer to display the corresponding windows on the screen. For example, application software 201 draws contents in window buffer 215, which is typically allocated from system memory 211 (e.g., volatile RAM 105 in FIG. 1). When the size of the window is changed, a new window buffer is allocated to replace the old one in order to accommodate the window of the new size. Frame buffer 221 contains data for the screen image of the windows that are displayed on the screen of display device 205. When the window for application software 201 is moved on the screen, the content in the window is not changed; and the application software does not have to update window buffer 215. The window system copies the data in the window buffer to the correct position in frame buffer 221 to display the window in the new location on the screen. When the window is partially covered by other windows, a portion of data in window buffer 215 is copied onto the frame buffer to display the corresponding portion of the window that is visible. Frame buffer 221 is typically under control of graphics hardware 203 (e.g., graphics/video card) which controls the display of the windows on the screen of display device 205 using the data in the frame buffer.

Thus, in a buffered window system, operations for creating the contents in windows are separated from operations for composing a screen image from images of windows for different applications. Applications create (or update) images of the windows (contents for the windows) in window buffers; and the window system composes a screen image from images of the windows in the window buffers. The window buffers are independent from the frame buffer.

For illustration purpose, window buffers are illustrated in various Figures (FIGS. 3-10) at the locations in the frame buffers where the corresponding windows are displayed. It will be understood that such illustrations indicate that contents in the corresponding window buffers can be copied by the window system to the corresponding locations in the frame buffers to display the windows in these locations. It will be understood that these window buffers are not part of the frame buffers.

FIGS. 3-5 illustrate a prior art scenario of resizing a buffered window. In FIG. 3, window buffer 303 is shown on top of the portion of the frame buffer where the window is displayed before a resizing operation. When the user causes cursor 307 to drag grow box 305 (e.g., pressing and holding down a mouse button while the cursor is over the grow box and moving the mouse, or using keyboards or other input devices to provide similar inputs), the user starts to resize the window. Window 303 contains area 311 for displaying contents (e.g., list of folders or files in a folder) and scroll bar 313. The position and the size of thumb 315, with respect to the scroll bar, indicate the position and the size of the portion of the content visible in area 311 with respect to the entire content. When the window is resized to the size as indicated by the position of cursor 407 in FIG. 4, new window buffer 403 is allocated for the window according to the current size of the window. Then, the application updates new window buffer 403 to display the image of the window after resizing, as shown in FIG. 5. Since a portion of window is not changed after resizing, the data for that portion is copied from the old window buffer into the new window buffer; and the portion that is changed after resizing is redrawn by the application in the new window buffer. After the data is copied from the old window buffer to the new window buffer, the old window buffer is freed (or released) so that the memory allocated for the old window buffer can be used for other purposes. For example, the content in area 511 is not changed after resizing. Thus, the data in area 311 of window buffer 303 is copied into area 511 in window buffer 403. Then, window buffer 303 is freed. Area 517 is drawn, and scroll bar area 513 is redrawn, to display additional contents visible in area 517 and to indicate the updated position and size of the portion displayed in the visible area versus the entire content. When window buffer 403 is updated, the application can ask the window system to flush the contents in the window buffer to frame buffer 301 to actually display the image of the window.

SUMMARY OF THE INVENTION

Methods and apparatuses for resizing buffered windows in a graphical user interface are described here.

In one aspect of the invention, a method to resize a buffered window on a data processing system includes: determining an estimated size for a window which has a first pixel image of a first size buffered in a first window buffer; allocating a second window buffer which is large enough to buffer the window in the estimated size; and buffering a second pixel image of the window in a second size in the second window buffer. In one example according to this aspect, a portion of a frame buffer is updated to the second pixel image to display the window in the second size. The estimated size is determined in response to a user instructing the data processing system to resize the window, or in response to an activity of the data processing system (e.g., a computer program instruction initiated by a machine intended to resize the window, such as a system call from a software program or hardware sensor), or in response to other events or inputs. The estimated size may be a predetermined size (e.g., a size based on a viewable area of a display device, such as the size of a screen that is attached to the data processing system), or computed from one or more parameters (e.g., the size of a screen, the current size of the window, a predetermined increment for changing size). The second pixel image of the window in the second size is buffered in the second window after receiving a request to resize the window to the second size, or in response to a determination that the window is to be resized (e.g., when the window is live resized for animation). A portion of the second window buffer, storing the data that represents the second pixel image, is clipped to update the corresponding portion of the frame buffer. After the second pixel image is buffered in the second window buffer, the first window buffer is freed. Before the first window buffer is freed, data for a first portion of the window, which represents a pixel image for the first portion not changed when the window is resized from the first size to the second size, is copied from the first window buffer to the second window buffer.

In one example, input of resizing the window to a third size is received to further resize the window; and a third pixel image of the window in the third size is buffered in the second window buffer. A portion of the frame buffer is then updated to the third pixel image to display the window in the third size.

In one example, when input of ending resizing the window is received, the second window buffer is resized according to the current size of the window. For example, the size of the second window buffer is reduced according to the final size of the window; alternatively, a new window buffer for the window of the current size is allocated.

In one example, the second window buffer is allocated in response to the input to start to resize the window; in another example, the second window buffer is allocated in response to a determination that the first window buffer is not large enough to buffer the window in the second size; in a further example, the second window buffer is allocated in response to a determination that the first window buffer is not large enough to buffer the window in the estimated size.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
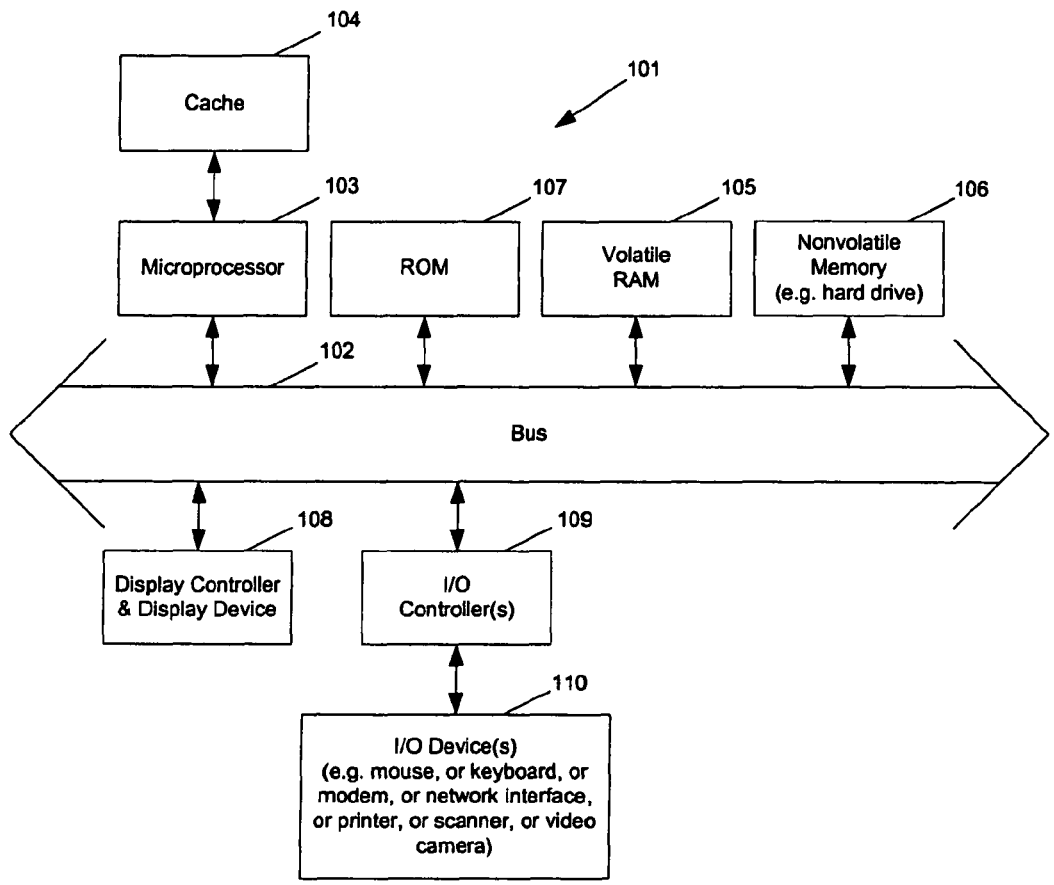
FIG. 1 shows a block diagram example of a data processing system which may be used with the present invention.
Figure 2:
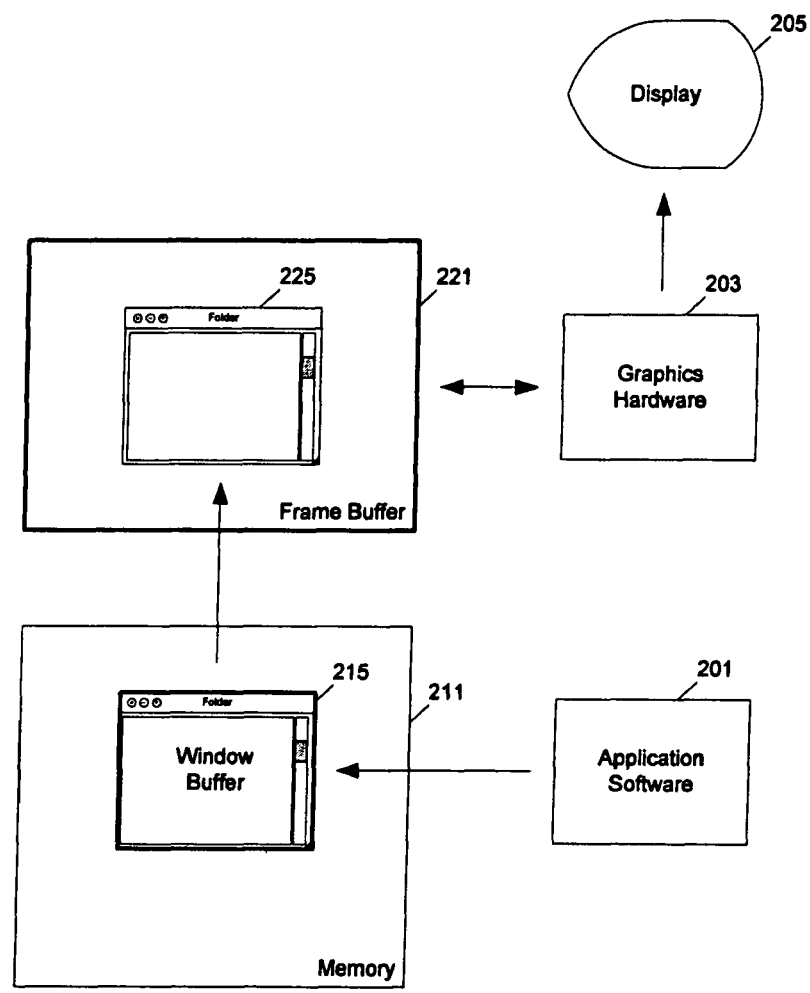
FIG. 2 illustrates a buffered window system.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present invention seeks to optimize the performance of live resizing of buffered windows by using methods that avoid excessive buffer allocations.

When a live resizing 'session' starts (e.g., a mouse-down event on a grow box), a temporary buffer that is large enough for the session (e.g., one that is the size of the screen, or an educated guess on how big the window may become) is allocated. A clipping rectangle is used to display the part of the temporary buffer that is currently valid. The area within the clipping rectangle in the temporary buffer is used to buffer the window. In the subsequent resizing, the clipping rectangle is changed according to the changing size of the window so that the window can be buffered in the area of the temporary buffer specified by the corresponding clipping rectangle; and further buffer allocations are avoided. When the live resizing 'session' ends (e.g., a mouse-up event on the grow box), the temporary buffer is reduced to the final size.

Since a clipped area from the temporary buffer is used to display the window, an application only needs to redraw the area where changes occur when the window is changed from one size to the other. There is no need for redrawing or copying the data for the area that is not changed. The number of page-faults is reduced significantly because the buffer memory is reused when the window is changed from one size to another. If the window system is implemented with 3D graphics hardware, releasing and rebinding the texture that represents the window can also be avoided. Thus, a significant performance gain can be achieved using methods according to various embodiments of the present invention.

Figure 3:
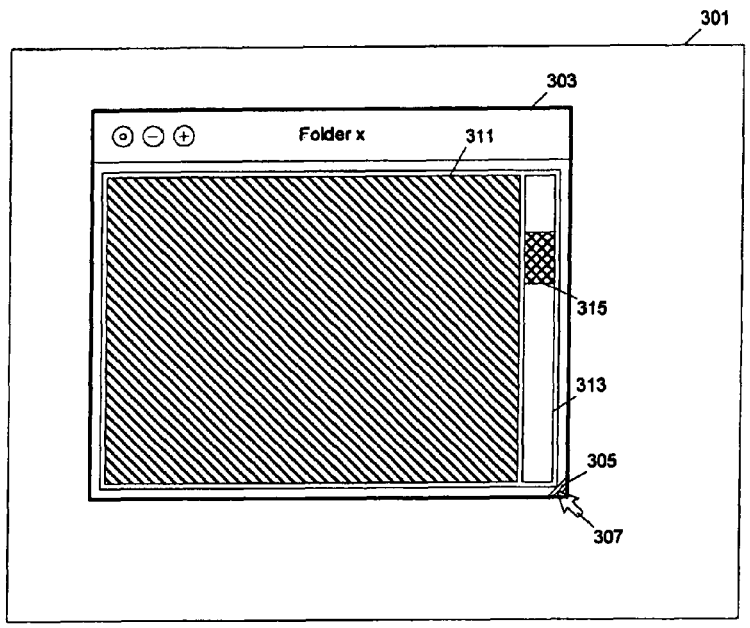
FIGS. 3-5 illustrate a prior art scenario of resizing a buffered window.
Figure 4:
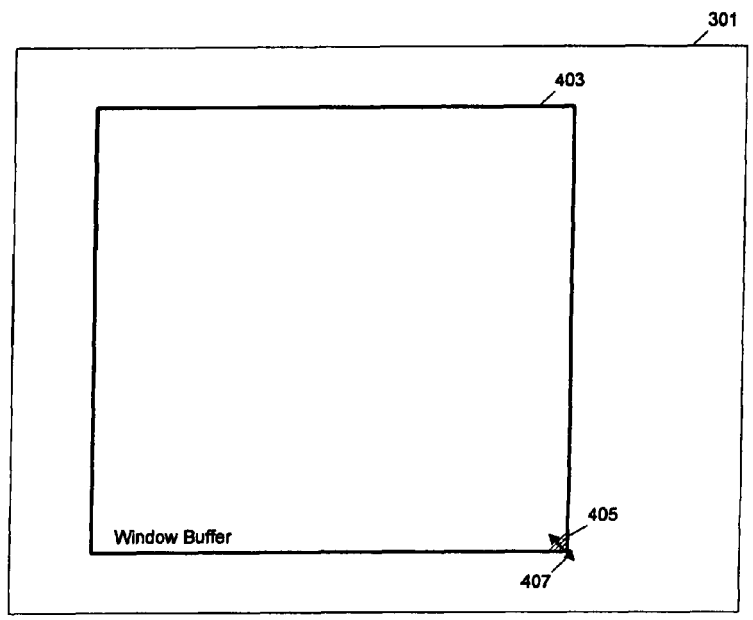
Figure 5:
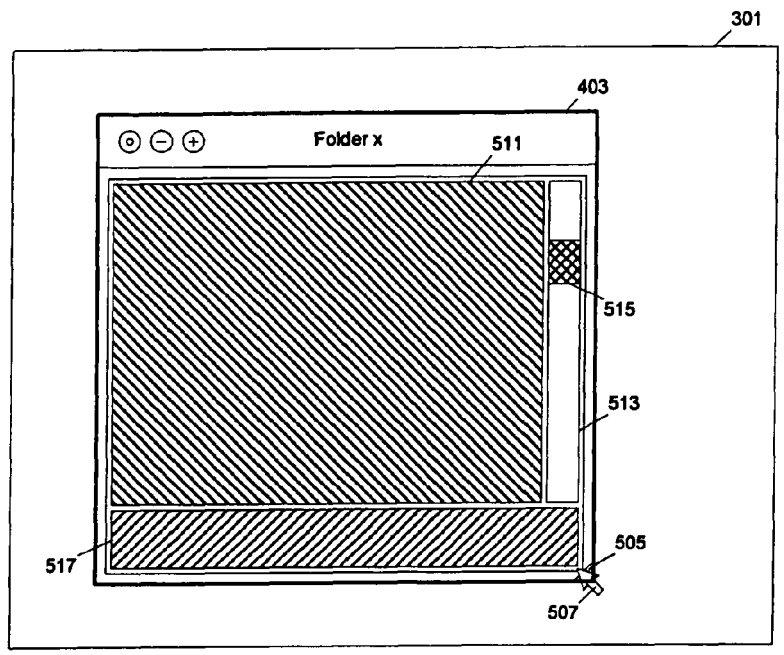
Figure 6:
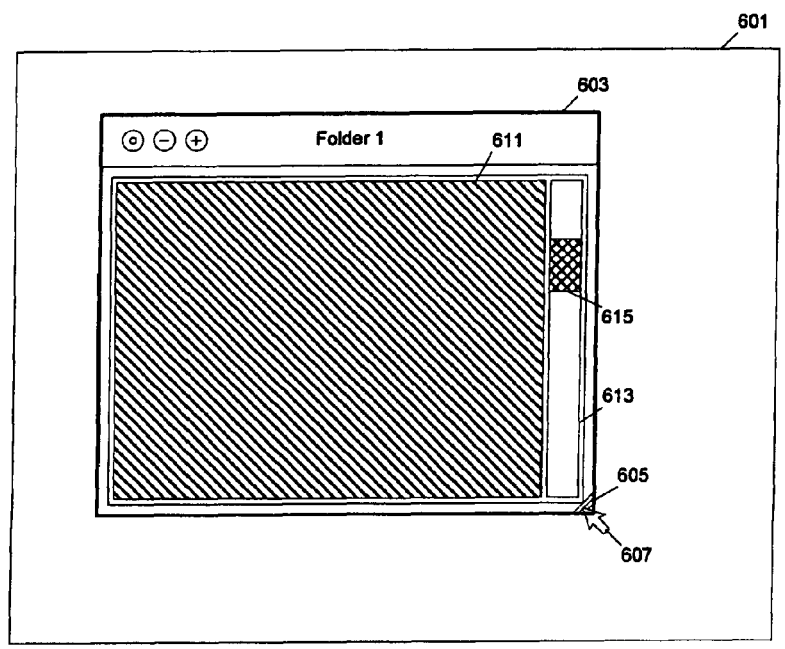
FIGS. 6-10 show scenarios of resizing a buffered window according to embodiments of the present invention.

FIGS. 6-10 show scenarios of resizing a buffered window according to embodiments of the present invention. In FIG. 6, window buffer 603 is shown on top of the portion of frame buffer 601 before a live resizing operation. When the user causes cursor 607 to drag grow box 605 (e.g., pressing and holding down a mouse button while the cursor is over the grow box and moving the mouse, or using keyboards, or through a command recognized by a voice recognition system, or other input devices to provide similar inputs), the user starts to resize the window. Similar to window 303 in FIG. 3, window 603 contains area 611 for displaying contents (e.g., list of folders or files in a folder) and scroll bar 613. The position and the size of thumb 615, with respect to the scroll bar, indicate the position and the size of the visible portion of the content in area 611 with respect to the entire content.

Figure 7:
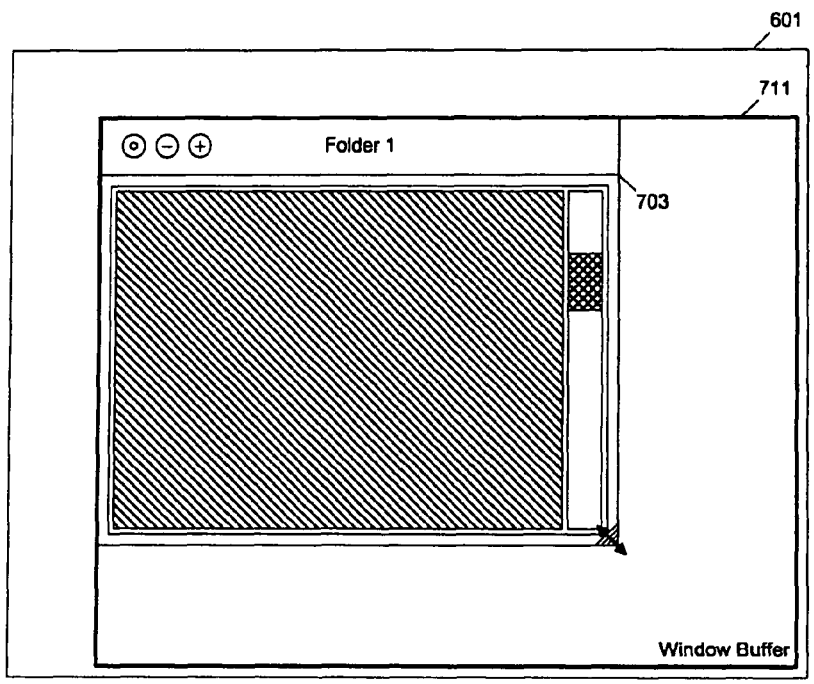

When the user starts to resize the window, an estimated size of the window is determined. In FIG. 7, it is determined that the largest window size that can reach in the current resizing operation is corresponding to dragging the grow box to the lower right corner of the screen. Thus, window buffer 711 is allocated for the window. The data in window buffer 603 is copied into window buffer 711; and then, window buffer 603 is freed. Clipping rectangle 703 indicates the currently valid data area for display. Thus, the window system copies the data within clipping rectangle 703 to update the frame buffer in order to display the window.

Figure 8:
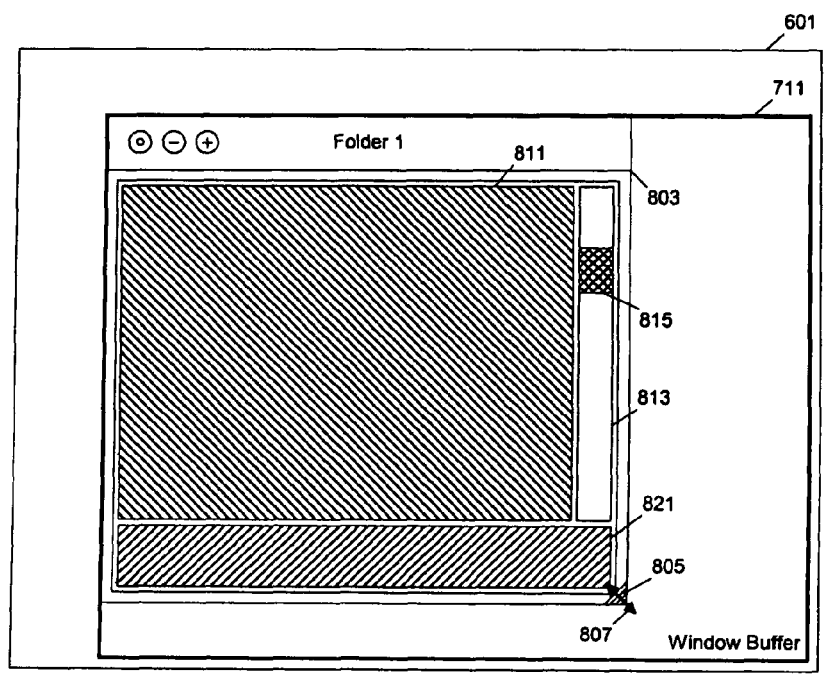

When the user drags grow box 805 to change the height of the window to that indicated by the position of cursor 807 in FIG. 8, clipping rectangle 803 is used to indicate the currently valid data area. Since the content of area 811 is not changed, the application does not have to update it. No copying operation is necessary. The application only needs to update area 821 and scroll bar area 813 to show additional contents in area 821 and to draw a new scroll bar to indicate the updated position and size of the visible area versus the entire content.

Figure 9:
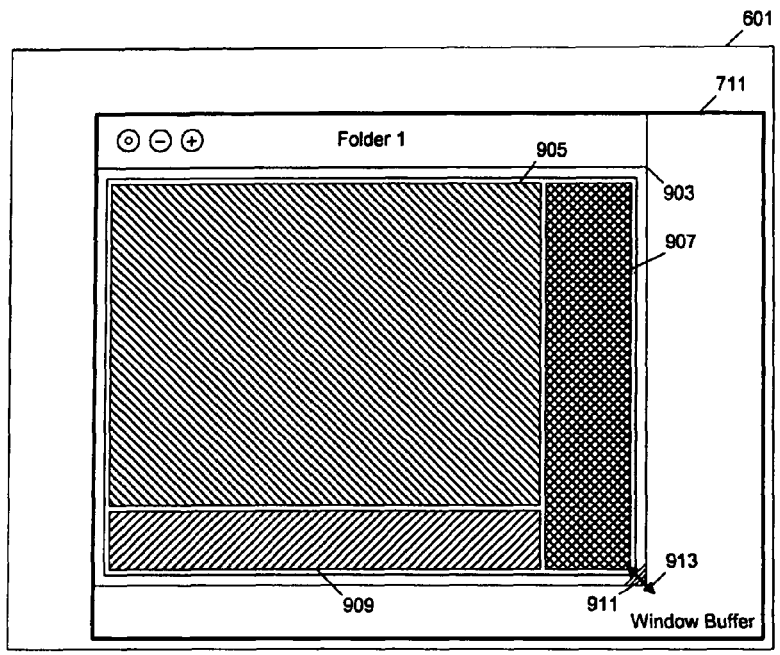

When the user drags grow box 911 to further change the width of the window to that indicated by the position of cursor 913 in FIG. 9, clipping rectangle 903 is used to indicate the currently valid data area. If areas 905 and 909 are not changed after changing the width, the application only needs to draw for area 907. The application updates only the area that is changed from the previous image of the window. Window buffer 711 is reused; allocation for a new window buffer is not performed; and there is no need to copy data from an old window buffer to a new window buffer.

Figure 10:
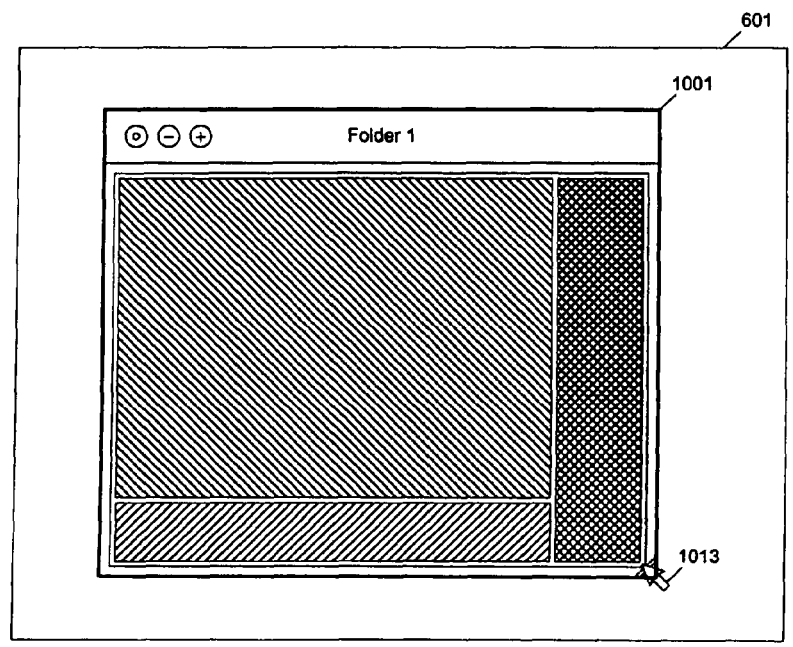

When the user releases grow box 913 (e.g., releasing the mouse button held down while dragging the grow box, or providing equivalent inputs from a keyboard or other input devices), the 'session' of live resizing ends; and the size of the window is finalized. In FIG. 10, the final size of the window is indicated by the position of cursor 1013, where the user releases the grow box to end resizing. Window buffer 711 is resized as window buffer 1011 according to the final size of the window. In one embodiment of the invention, the data in window buffer 711 is rearranged; and the extra memory is returned to the system. In another embodiment of the invention, a window buffer for the window of the final size is allocated; and data is copied from window buffer 711 to the new window buffer for the window of the final size.

Figure 11:
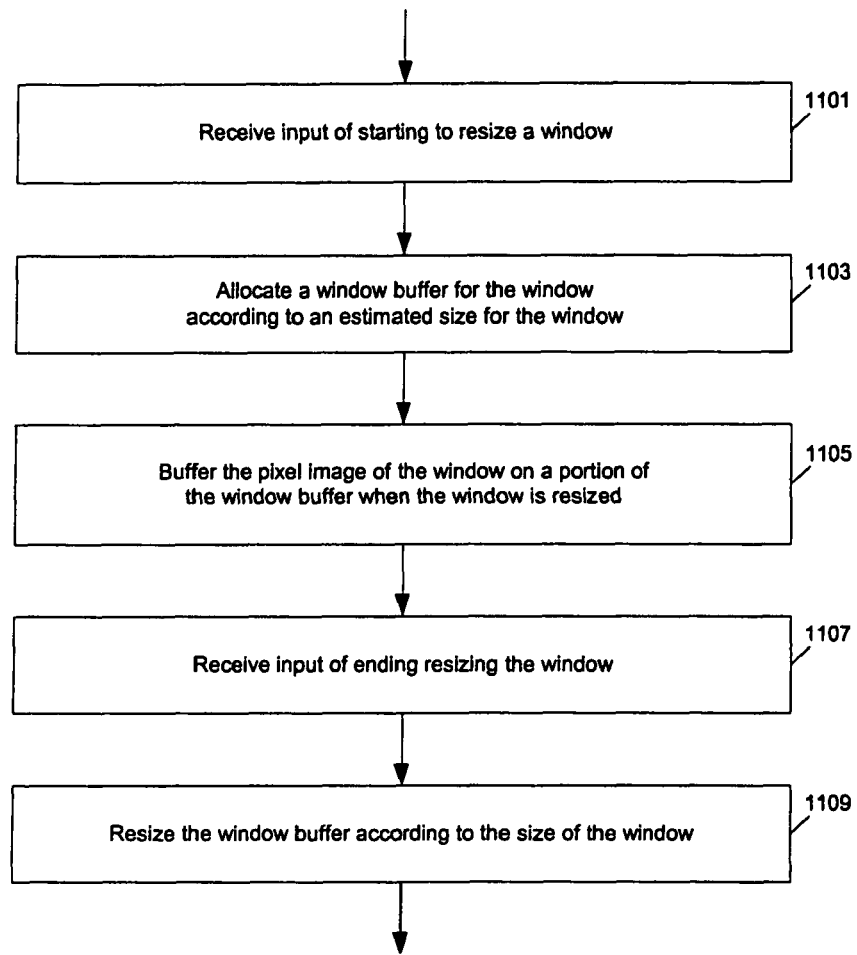
FIG. 11 shows a flow chart for a method to resize a buffered window according to one embodiment of the present invention.

FIG. 11 shows a flow chart for a method to resize a buffered window according to one embodiment of the present invention. After operation 1101 receives input to start to resize a window (e.g., pressing down a mouse button on a grow box or a portion of the border of the window, pressing a short-cut key, a command recognized by a voice recognition system, or others), operation 1103 allocates a window buffer for the window according to an estimated size for the window (e.g., the size of the entire screen, the maximum size that can be reach from the current position, or other estimations). The input to start to resize the window may be in response to a user instructing the data processing system to resize the window, or in response to an activity of the data processing system (e.g., a computer program instruction initiated by a machine intended to resize the window, such as a system call from a software program or hardware sensor), or in response to other events or inputs (e.g., predetermined conditions or criteria are met). The estimated size may be a predetermined size (e.g., a size based on a viewable area of a display device, such as the size of a screen that is attached to the data processing system), or computed from one or more parameters (e.g., the size of a screen, the current size of the window, a predetermined increment for changing size). Operation 1105 buffers the pixel image of the window in a portion of the window buffer when the window is resized. When the size of the window is continuously changed, the size of the clipped portion is changed accordingly without reallocating a new window buffer. The pixel image buffered in the clipped portion of the window buffer is used to update the corresponding image of the window in the frame buffer. The window may be resized in response to a request (e.g., input from a user input device, such as a mouse, a track ball, a touch pad, or a voice recognition system) to resize the window, or in response to a determination that the window is to be resized (e.g., when the window is live resized for animation). After operation 1107 receives input of ending resizing the window (e.g., releasing the mouse button held down during dragging, or pressing a short-cut key, or others), operation 1109 resizes the window buffer according to the current size of the window (e.g., returning extra memory to the system, or reallocating a window buffer of the current size).

Figure 12:
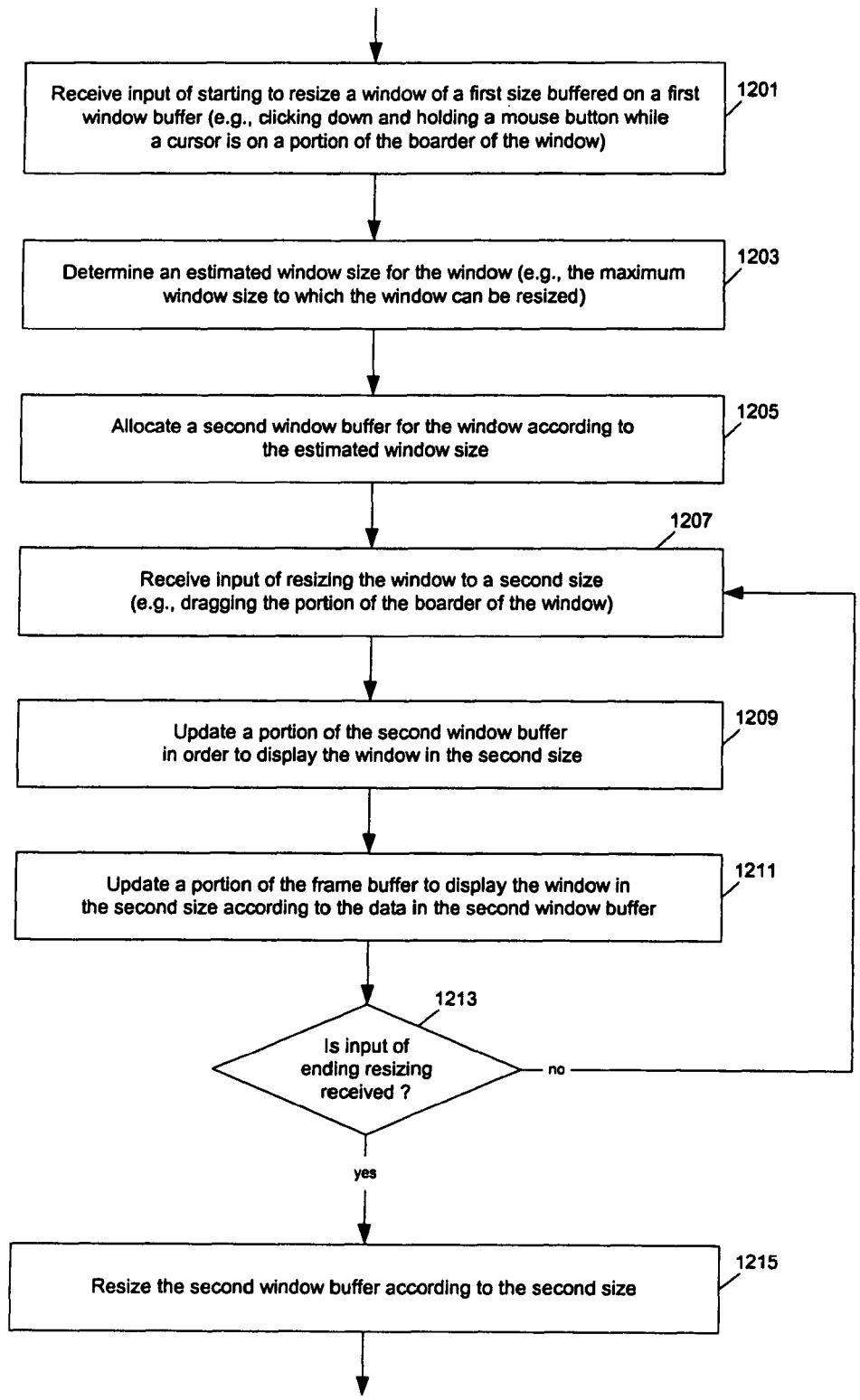
FIG. 12 shows a detailed flow chart for a method to resize a buffered window according to one embodiment of the present invention.

FIG. 12 shows a detailed flow chart for a method to resize a buffered window according to one embodiment of the present invention. After operation 1201 receives input to start to resize a window of a first size buffered in a first window buffer, operation 1203 determines an estimated window size for the window. Operation 1205 allocates a second window buffer for the window according to the estimated window size. After operation 1207 receives input of resizing the window to a second size, operation 1209 updates a portion of the second window buffer to update the image of the window in the second size. A portion of the frame buffer is updated to display the window in the second size according to the data in the second window buffer. If it is determined that input of ending resizing is received in operation 1231, operation 1215 resizes the second window buffer according to the second size (the current size of the window); otherwise, operation 1207-1213 is repeated for live resizing until input of ending resizing is received.

Although FIGS. 6 and 12 illustrate scenarios where a window buffer for an estimated size is allocated in response to input to start to resizing the window, it will be apparent to one skilled in the art from this description that allocating the temporary window buffer can be in response to other conditions after the user starts to resize the window. For example, the temporary window buffer can be allocated in response to a determination that the current window buffer is not large enough to buffer the window in the second size, or in response to a determination that the first window buffer is not large enough to buffer the window in an estimated size.

Figure 13:
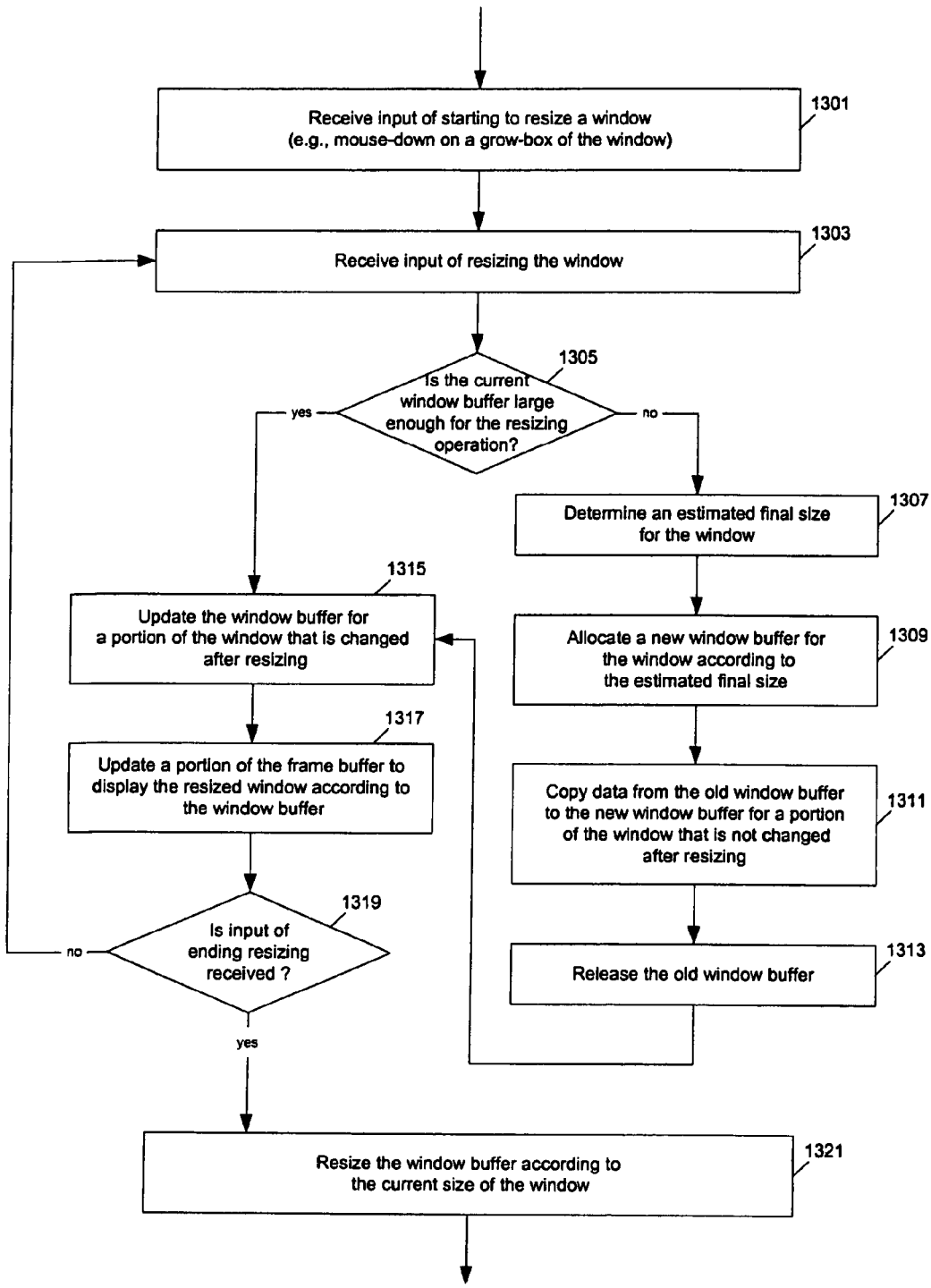
FIG. 13 shows a detailed flow chart for a method to resize a buffered window according to another embodiment of the present invention.

FIG. 13 shows a detailed flow chart for a method to resize a buffered window according to another embodiment of the present invention. After operation 1301 receives input to start to resize a window and operation 1303 receives input of resizing the window (e.g., the current size of the window is different from the previous size), operation 1305 is performed to determine whether or not the current window buffer is large enough for the resizing operation (e.g., whether or not the current window buffer is large enough for the resized window, or whether or not the current window buffer is likely large enough for continued resizing). If the current window buffer is large enough, operation 1315 updates the window buffer for a portion of the window that is changed after resizing; and operation 1317 updates a portion of the frame buffer to display the resized window according to the window buffer. If operation 1319 determines that input of ending resizing is received, operation 1321 is performed to resize the window buffer according to the current size of the window; otherwise, operation 1303 is performed to continue live resizing. If operation 1305 determines that the current window buffer is not large enough, operation 1307 determines an estimated final size for the window. Operation 1309 then allocates a new window buffer for the window according to the estimated final size. After operation 1311 copies data from the old window buffer to the new window buffer for a portion of the window that is not changed after resizing, the old window buffer is released (freed) in operation 1313; and operations 1315-1317 are performed to update the image of the window of the new size.

Figure 14:
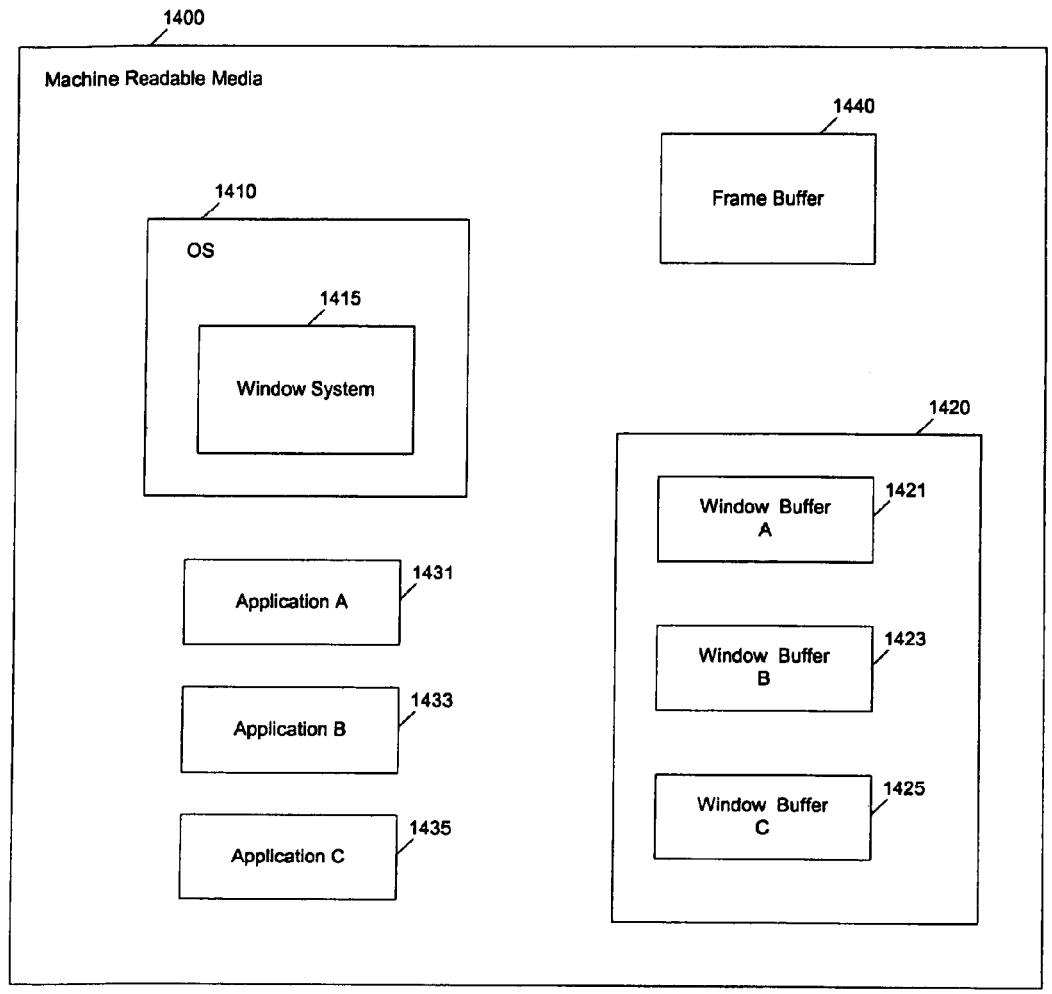
FIG. 14 shows an example of a machine readable media, which may be used to store software and data which when executed by a data processing system causes the system to perform various methods of the present invention.

FIG. 14 shows an example of a machine readable media, which may be used to store software and data which when executed by a data processing system causes the system to perform various methods of the present invention. As noted above, this executable software and data may be stored in various places including for example ROM 107, volatile RAM 105, non-volatile memory 106 and/or cache 104 as shown in FIG. 1. Portions of this software and/or data may be stored in any one of these storage devices. Media 1400 for example may be primarily volatile RAM 105 and non-volatile memory 106 in one embodiment. OS 1410 represents an operating system. Window system 1415 represents a window managing system, which is typically a part of OS 1410. Applications 1431-1435 represent application software, which display contents in corresponding windows on the system. Window buffers 1421-1425 represent the data for the pixel images of the windows drawn by applications 1431-1435 respectively. Applications 1431-1435 communicate with window system 1415 for allocating window buffers, drawing or updating contents in the window buffers, reallocating window buffers when the sizes of the windows are changed, allocating temporary window buffers of estimated sizes for live resizing using methods according to various embodiments of the present invention, etc. Frame buffer 1440 represents the data for the screen image to be displayed on a screen. Window system 1415 composes the data in frame buffer 1440 from window buffers 1420 according to the layout parameters (e.g., locations, hierarchy, and others) for the windows. Window buffers 1420 may be primarily on volatile RAM 105, or primarily on video memory (e.g., in display controller 108). Frame buffer may be primarily on video memory in display controller 108, or primarily on volatile RAM 105. Using the methods of various embodiments of the present invention, an application (e.g., 1431) communicates with window system 1415 to allocate a large enough temporary window buffer, draw in a clipped portion of the temporary window buffer (e.g., 1421) to update the pixel image of the window, and use the clipped portion of the window buffer to update the corresponding portion of the frame buffer during live resizing.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for resizing a window performed on a computing system, comprising:
buffering, in a first window buffer, data used to generate a window having a first size, the first window buffer stored in a memory of the computer system;

receiving an input to resize the window, the window displayed by a display of the computer system;

estimating, based at least in part on the input, an estimated second size for the window;

allocating a second window buffer using the estimated second size for the window, wherein the second window buffer is stored in the memory of the computer system, and wherein data buffered in the first window buffer is used in the second window buffer; and generating a new display of the window having a different size for display by the display of the computer system using the second window buffer, the new display generated in response to operations of resizing the window from the first size.

2. The method of claim 1, wherein receiving the input includes receiving a cursor position of a cursor controlled by a user during the operations of resizing the window.

3. The method of claim 2, wherein the first size and the different size of the window are indicated, at least in part, by respective values of the cursor position in the display of the computer system.

4. The method of claim 1, wherein the estimated second size is established, at least in part, using an increment for reducing or increasing the first size of the window.

5. The method of claim 1, wherein the estimated second size is determined based on one or more of: a size of the display of the computer system, a viewable area of the display of the computer system, the first size of the window, or a predetermined increment for changing the first size of the window.

6. The method of claim 1, further comprising:
buffering, in the second window buffer, at least a portion of the data buffered in the first window buffer; and
updating the second window buffer for a portion of the window that is changed during the operations of resizing the window.

7. The method of claim 6, wherein data in the second window buffer for a second portion of the window that is not changed during the operations of resizing the window is unchanged from the first window buffer.

8. A non-transitory computer readable storage medium including instructions that, when executed by a computing system, cause the computing system to:
buffer, in an existing window buffer, data used to generate a display of a window in a graphical user interface, the window having an initial size;
process an input received by the computing system to resize the window displayed in the graphical user interface;
estimate, based at least in part on the input, an estimated new size for the window; and
allocate a new window buffer according to the estimated new size for the window, wherein data buffered in the existing window buffer is used in the new window buffer.

9. The non-transitory computer readable storage medium of claim 8, the instructions further causing the computing system to:
generate a resized display of the window in the graphical user interface using the new window buffer, the resized display of the window having a new size, wherein the resized display is generated in response to the input to resize the window from the initial size to the new size.

10. The non-transitory computer readable storage medium of claim 9, the instructions further causing the computing system to:
buffer, in the new window buffer, at least a portion of the data buffered in the existing window buffer;
wherein the new size of the window is larger in at least a first direction and smaller in at least a second direction than the initial size of the window.

11. The non-transitory computer readable storage medium of claim 8, the instructions further causing the computing system to:
update the new window buffer for a portion of the window that is changed during operations to resize the window and that is not buffered in the existing window buffer.

12. The non-transitory computer readable storage medium of claim 8, the instructions further causing the computing system to:
receive a cursor position controlled by a user during operations to resize the window.

13. The non-transitory computer readable storage medium of claim 12, wherein the initial size is determined based on the cursor position in the graphical user interface, and wherein the cursor position is controlled by the user during the operations to resize the window.

14. The non-transitory computer readable storage medium of claim 8, wherein estimating an estimated new size for the window is performed: in response to determining that the window is to be resized, in response to a user instructing the computing system to resize the window, or in response to an activity of the computing system.

15. The non-transitory computer readable storage medium of claim 8, wherein the estimated new size for the window is determined using one or more of: the size of a screen of the computing system, the initial size of the window, or an increment for resizing the window.

16. A system, comprising:
a display device configured to generate a display of a window in a graphical user interface;
an input device configured to receive user input; and
a memory and a processor configured to enable execution of instructions, wherein the processor is configured to process the user input received from the input device, during a resizing operation of the window from a current size to a larger size indicated from the user input, with the execution of instructions to:
calculate an estimated size of the window to buffer data for the window during the resizing operation, wherein the estimated size is calculated using the user input, and wherein the estimated size is larger in at least one direction than the current size of the window; and
maintain a window buffer in the memory for display of the larger size of the window, the window buffer being sized to the estimated size, wherein buffered data previously buffered for the window provides data for the window buffer as the window changes from the current size to the larger size during the resizing operation.

17. The system of claim 16, the processor further configured for the execution of instructions to:
display the larger size of the window in the graphical user interface using the new window buffer, the display of the larger size of the window provided in response to instructions to resize the window from the current size to the larger size.

18. The system of claim 16, wherein user input is used to move a position of a cursor in the graphical user interface, and wherein the current size and the larger size of the window are indicated by respective positions of the cursor.

19. The system of claim 16, wherein the estimated size is determined based on one or more of: a size of a display screen used to display the graphical user interface, a size of the window set by an application, or an increment for changing the current size of the window.

20. The system of claim 16, the processor further configured for the execution of instructions to:
   update the window buffer for a portion of the window that is changed during the resizing operation.

21. The system of claim 16, wherein the input device is a keyboard, mouse, track ball, touch pad, or voice recognition system.

* * * * *